United States Patent Office 3,470,268
Patented Sept. 30, 1969

3,470,268
METHOD FOR THE PREPARATION OF SEGMENT POLYESTERS WITH SHORT, ALTERNATING SEGMENTS OF POLYCARBONATE AND POLYESTER
Rudolf Nehring, Marl, Roland Feinauer, Haltern, and Wolfgang Seeliger, Marl, Germany, assignors to Chemische Werke Huls Aktiengesellschaft, Marl, Germany, a corporation of Germany
No Drawing. Filed Dec. 27, 1966, Ser. No. 604,665
Claims priority, application Germany, Feb. 11, 1966, C 38,192
Int. Cl. C08g 17/13, 17/08
U.S. Cl. 260—860
9 Claims

ABSTRACT OF THE DISCLOSURE

Segment polyesters, having short, alternating, carbonate and terephthalate segments are prepared by (1) transesterification of certain dihydroxy-compounds containing carbonate groups, with a terephthalic acid dialkyl ester and (2) subsequent condensation polymerization.

---

The object of the invention is to provide a method for the preparation of segment polyesters in which carbonate segments of from 1 to 20 units of the general formula (I) 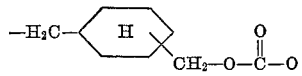

are alternated with terephthalate segments of the general formula (II) 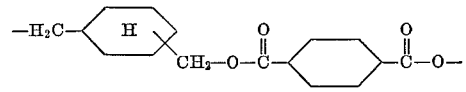

or with bis-terephthalate segments of the general formula (III)

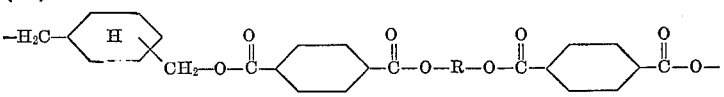

in which R represents a 1,3- or 1,4-dimethylene cyclohexane radical.

There are a great number of publications which relate to the preparation of polycarbonates as well as to their properties, for example, Houben-Weyl, Methoden der Organischen Chemie, volume XIV/2, pages 48 to 56 (1963). Polycarbonates prepared by use of aliphatic diols are wax-like masses or microcrystalline powders which have only a very limited industrial significance as synthetic resins due to their low softening points. If polyfunctional phenols are converted, the products so obtained are polycarbonates which are insoluble in standard solvents and which will decompose at their melting point temperatures, while 2,2-(p,p'-dihydroxydiphenyl)propane will give a polycarbonate which will dissolve in chlorinated hydrocarbons such as methylene chloride, ethylene chloride, trichloroethane and chloroform but will only swell in aromatic solvents such as benzene or chlorobenzene.

It is also known from French Patent No. 1,381,007 to employ cycloaliphatic diols, such as bis(hydroxymethyl) cyclohexane, for the preparation of polycarbonates. The polycarbonates so obtained have desirable plastic characteristics and are easily soluble. They possess a high surface gloss, are transparent and have only a slight tendency to crystallize. They are further advantageous because of their adhesion to glass and metal and great impact strength, even at low temperatures. They will dissolve easily in chlorinated hydrocarbons as well as in aromatic solvents which is of utmost importance when used in the field of varnishes. These cycloaliphatic polycarbonates have one disadvantage, namely their relatively low dimensional heat stability according to Vicat, i.e., approximately at 45° C.

The characteristics of terephthalic acid polyesters differ substantially from the characteristic of the cycloaliphatic polycarbonates. These polyesters have such a great tendency to crystallize that nonstretched molded bodies will become opaque and brittle due to crystallization, either spontaneously or under the influence of swelling media. Furthermore, the melting points of poly[1,4-bis(hydroxymethyl)cyclohexane terephthalate] which at a trans-diol content of approximately 75% melts at 290° C. and of poly(ethylene glycol terephthalate) which melts at 260° C. necessitate high processing temperatures. These properties make it very difficult to process these materials by injection molding and lead to brittle and opaque molded articles. Also, since these polyesters are not, or only slightly, soluble in standard organic solvents, processing from solution is not feasible. On the other hand, terephthalic acid polyesters have very high and desirable dimensional heat stability values according to Vicat: i.e., above 200° C. in case of poly[1,4-bis(hydroxymethyl)cyclohexane terephthalate] as well as in case of poly(ethylene glycol terephthalate).

It has been found that segment polyesters, consisting of short, alternating carbonate and terephthalate segments, with excellent and desirable characteristics can be prepared if carbonate group containing dihydroxy compounds of the general formula (VI)

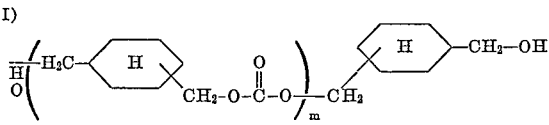

in which m represents values from 1 to 10, preferably 1 to 6, or mixtures thereof with terephthalic acid dialkyl esters, with or without admixture of diols of the general formula HO—R—OH in which R represents the 1,3- or 1,4-dimethylenecyclohexane residue, are caused to react in the presence of a catalyst in a manner known per se.

Dihydroxy compounds of the general Formula IV are prepared by allowing 1,3- or 1,4-bis(hydroxymethyl) cyclohexane to react with their bis-chlorocarbonates or with phosgene. The 1,3- and 1,4-bis(hydroxymethyl) cyclohexane can be used as pure cis- or trans-compounds or in the form of cis-trans-mixtures. The preparation of dihydroxy compounds of the general Formula IV is not claimed.

The dialkylesters of the terephthalic acid utilized are those which during the trans-esterification will form alcohols with relatively low boiling points, allowing separation by distillation from the reaction mixture, such as dimethyl terephthalate, diethyl terephthalate, dibutyl terephthalate or bis(2-hydroxyethyl)terephthalate.

As the trans-esterification catalysts the alcoholates, hydrides, acetates and oxides of the alkali metals, alkaline earth metals and titanium are used. Also suitable are the acetates and oxides of zinc and antimony and the alkali metal and ammonium salts of aliphtic acids containing 6 to 12 C-atoms. The catalysts are employed in quanties ranging from .01 to 1 molar percent, preferably .05 to .2 molar percent, relative to the terephthalic acid diester used.

By allowing dihydroxy compounds of the Formula IV to react with dialkyl esters of terephthalic acid at a molar ratio of 1:1, it is possible to prepare segment polyester with an alternating order of one terephthalate segment (Formula II) and $m$ carbonate units (Formula I).

Segment polyesters of this type with $2m$ carbonate units to one terephthalate segment can also be obtained by trans-esterification of, for example, dimethyl terephthalate and twice the molar quantity of dihydroxy compounds of the Formula IV, followed by polycondensation, splitting-off the bis(hydroxymethyl)cyclohexane. Products obtained in this manner have a particularly high molecular weight.

Another series of segments polyesters with an alternating order of bis-terephthalate segments of Formula III and $m$ carbonate units of Formula I can be prepared by the reaction of dihydroxy compounds of Formula IV with twice the molar quantity of, for example, dimethyl terephthalate, followed by trans-esterification with twice the molar quantity of cycloaliphatic diols of the formula HO—R—OH in which R has the value stated above, followed by polycondensation with splitting-off of the molar quantity of the cycloaliphatic diol.

According to the invention the dialkyl terephthalate with the oligomeric dihydroxycarbonates of Formula IV is trans-esterified in the presence of one of the catalysts described above at temperatures between 100 and 270° C. and under an atmosphere which is free of $O_2$. This is followed by a condensation at a pressure of less than 5 torrs and at temperatures between 190 and 280° C., preferably between 230 and 270° C., the process being continued until the desired degree of polycondensation has been obtained. Under the above described conditions the carbonate bonds will be maintained and there will not occur any $CO_2$-separation or a formation of ether groupings.

It is particularly advantageous if the polycondensation stage is accomplished continuously in a polycondensation tube.

The method of the invention permits the preparation of segment polyesters which were unkown heretofore and which combine in a surprising and unexpected manner the industrially useful properties of the terephthalic acid polyesters with the advantageous features of the cycloaliphatic polycarbonates. The segment polyesters so obtained possess the proper transparency and the good solubility of the polycarbonates in chlorinated hydrocarbons as well as in aromatic solvents. Even a segment polyester with an alternating order of one carbonate unit (Formula I) and one bis-terephthalate unit (Formula III) is easily soluble in chlorfrom, in contrast to terephthalic acid polyesters. Furthermore, the products obtained in accordance with the invention possess greater dimensional heat stability but without the tendency to crystallize spontaneously and thereby to become brittle, as in the case of polyesters manufactured by injection molding.

By varying the chain length of the carbonate-group-containing dihydroxy compound and by selection of the terephthalate segment it becomes feasible to control the characteristics, for example the dimensional heat stability or toughness of the segment polyesters extensively as shown by the table.

The segment polyesters prepared according to the method of the invention are thermoplastics which can be processed by pressing or injection into transparent, colorless molded articles, sheets, foils or coatings.

The segment polyesters are soluble in organic solvents, such as methylene chloride, chloroform, toluene, xylene, dioxan and dimethylformamide and can be processed into foils or filaments from these solutions. They can also be utilized as raw material for varnishes.

It is known from DAS 1,187,793 to lower the melt viscosity of the pure poly(bisphenol-A-carbonate) by the admixture of polyalkylene terephthalate and DAS 1,181,844 teaches that raw materials for varnishes with improved solubility characteristics can be obtained by processing a mixture of polyesters and polycarbonates at higher temperatures. In these two known methods the polymers are either mixed or allowed to react with each other, resulting in polymer mixtures or mixed condensates having very long, homogeneous blocks. There is no possibility to control characteristics as desired by varying short, alternating segments.

British Patents Nos. 954,500 and 912,203 show the possibility to prepare polyester-polycarbonate condensation mixtures by the reaction of high-molecular polyesters (molar weight of at least 10,000) with phosgene or bis-chlorocarbonates, or by heating a polyester together with a dialkyl- or diaryl-carbonate in the molten state. These methods are based on high-molecular compounds and require solutions of high viscosity which are difficult to handle industrially. If the reactions are carried out in very diluted, less viscous solutions, very large quantities of solvents are needed.

EXAMPLE 1

31.4 parts by weight (.1 mol) of bis(4-hydroxymethyl-cyclohexylmethyl)-carbonate (Formula IV, $m=1$), 38.8 parts by weight (.12 mol) of dimethyl terephthalate and 5 drops of a 30% solution of titanium tetraisopropylate in isopropanol were placed in a polycondensation tube and heated for ½ hour at 160° C. and for 3 hours at 200° C. in a current of purified nitrogen. After splitting off 6.4 parts by weight of methanol (.2 mol), 28.8 parts by weight (.2 mol) of bis(hydroxymethyl)-cyclohexane was added and the mixture was heated for an additional 3 hours at 200° C. until the remaining methanol (6.4 parts by weight, .2 mol) had split off. Thereupon, the reaction temperature was raised to 250° C. and a vacuum of $\leq.5$ torr was applied stepwise. After 15 hours the theoretically determined quantity of bis(hydroxymethyl)cyclohexane (.1 mol) had split off, leaving a segment polyester (66 parts by weight) with a K-value of 57 (in chloroform). The dimensional heat stability according to Vicat was 192° C.

Ultimate analysis and infrared spectra indicate that the segment polyester so obtained was structured by an order of one carbonate unit and one bis-terephthalate segment (Formula III).

$C_{41}H_{50}O_{11}$ (719) calculated: C, 68.5; H, 7.0; O, 24.5. Found: C, 68.9; H, 6.7; O, 24.2.

EXAMPLE 2

100 parts by weight of bis(4-hydroxymethylcyclohexyl-methyl)carbonate (.32 mol) (Formula IV, $m=1$) was mixed thoroughly with 75 parts by weight of dimethyl terephthalate (.38 mol) and 22 drops of a 30% titanium tetraisopropylate solution in isopropanol at a temperature of 70° C. and then heated for 2 hours to 250° C. under a nitrogen atmosphere. This temperature was maintained until the trans-esterification was terminated, in other words, until the expected quantity of methanol (approximately 20 parts by weight) was distilled off. After a polycondensation time of ½ hour at 250° C. and 1 torr and 1 hour at 270° C. and 1 torr, a K-value of 47 was obtained. The yield was 135 parts by weight of a transparent and colorless segment polyester with a dimensional heat stability according to Vicat of 95° C. Ultimate analysis showed that the trans-esterification had been accomplished fully and without any decomposition of the carbonate bonds.

$C_{25}H_{32}O_7$ (444.6) calculated: C, 67.7; H, 7.3; O, 25.2. Found: C, 67.5; H, 7.2; O, 25.3.

EXAMPLE 3

From 48.4 parts by weight (.1 mol) of an oligomeric carbonate of the Formula IV ($m=2$), 38.8 parts by weight (.2 mol) of dimethyl terephthalate and 28.8 parts by weight (.2 mol) of bis(hydroxymethyl)cyclohexane there was prepared, in the manner described in Example 1, a segment polyester with an order of 2 carbonate units of Formula I and one bis-terephthalate segment of Formula III. K-value (in chloroform): 47. Dimensional heat stability according to Vicat: 78° C.

Formula II was prepared in accordance with the method described in Example 5 from 96.8 parts by weight (.2 mol) of an oligomeric carbonate of the Formula IV ($m=2$) and 19.4 parts by weight (.1 mol) of dimethyl terephthalate. The transparent segment-polyester (78 parts by weight had the K-value 54 (in chloroform) and a dimensional heat stability according to Vicat of 52° C.

TABLE

| Example | m in Formula IV | Parts by weight of bishydroxycarbonate (IV) to 75 parts by weight of dimethyl terephthalate | Ratio [1] | Dimensional heat stability accord. to Vicat (° C.) | Appearance | Solubility in chloroform and toluene |
| --- | --- | --- | --- | --- | --- | --- |
| 1 | 1 | 60.6 | 1:1 (Formula III) | 192 | Transparent | Soluble. |
| 2 | 1 | 100 | 1:1 (Formula III) | 95 | do | Do. |
| 3 | 2 | 93.5 | 2:1 (Formula III) | 78 | do | Do. |
| 4 | 2 | 155 | 2:1 (Formula II) | 61 | do | Do. |
| 5 | 1 | 238 | do | 60 | do | Do. |
| 6 | 3 | 210 | 3:1 (Formula II) | 51 | do | Do. |
| 7 | 2 | 374 | 4:1 (Formula II) | 52 | do | Do. |

[1] Numerical ratio of the carbonate units of Formula I to the terephthalate segments of Formula II or Formula III.

EXAMPLE 4

155 parts by weight (.32 mol) of the diol IV with $m=2$ was mixed with 75 parts by weight (.38 mol) of dimethyl terephthalate and 22 drops of a 30% titanium tetraisopropylate solution in isopropanol at 70° C. and then heated to 250° C. under a nitrogen atmosphere. This temperature was maintained until approximately 20 parts by weight of methanol was distilled off. The polycondensation was carried out initially at 250° C. and then at 270° C. in a vacuum of less than 1 torr, whereby after one hour at 250° C. and one hour at 275° C. a K-value of 47 (measured in chloroform) was obtained. The yield was 190 parts by weight of a transparent and colorless polyester with a dimensional heat stability according to Vicat of 61° C.

EXAMPLE 5

62.8 parts by weight (.2 mol) of bis(4-hydroxymethyl-cyclohexylmethyl)carbonate (Formula IV, $m=1$), 19.4 parts by weight (.1 mol) of dimethyl terephthalate and 5 drops of a 30% solution of titanium tetraisopropylate in isopropanol was heated in a polycondensation tube for ½ hour at 160° C. and for 3 hours at 200° C. until all methanol (.2 mol) was split off. The temperature was then increased to 250° C. and a vacuum of .5 torr applied stepwise. Within 11 hours 14.4 g. (.1 mol) of bis(hydroxymethyl)cyclohexane distilled off. It consisted of a colorless, transparent segment polyester, built up of a series of 2 carbonate units (Formula I) to one terephthalate segment (Formula II), with a K-value of 56 (in chloroform) and a dimensional heat stability according to Vicat of 60.4° C.

EXAMPLE 6

210 parts by weight (.32 mol) of the carbonate group containing diol IV, with $m=3$, was mixed with 75 parts by weight (.38 mol) of dimethyl terephthalate and .5 part by weight of potassium palmitate at 70 to 80° C. and then heated gradually up to 250° C. under a nitrogen atmosphere. After the splitting-off of approximately 20 parts by weight of methanol, the polycondensation was continued with stirring for 2 hours at 250° C. under a vacuum of less than 1 torr. The yield was 240 parts by weight of a colorless and transparent polyester with a Vicat-value of 51.2° C. and a K-value of 40 (measured in a 1% solution in chloroform). Ultimate analysis shows that the trans-esterification has been accomplished fully and with the carbonate bonds intact.

$C_{43}H_{60}O_{13}$ (784.9) calculated: C, 65.9; H, 7.7; O, 26.4. Found: C, 66.4; H, 7.7; O, 25.9.

EXAMPLE 7

A segment polyester, formed of a series of 4 carbonate units of the Formula I and one terephthalate segment of Formula II was prepared in accordance with the method described in Example 5 from 96.8 parts by weight (.2 mol) of an oligomeric carbonate of the Formula IV ($m=2$) and 19.4 parts by weight (.1 mol) of dimethyl terephthalate. The transparent segment-polyester (78 parts by weight had the K-value 54 (in chloroform) and a dimensional heat stability according to Vicat of 52° C.

We claim:
1. Method for the preparation of segment polyesters with short, alternating carbonate and terephthalate segments which comprises
   (a) trans-esterifying a dihydroxy compound, containing carbonate groups, of the general formula

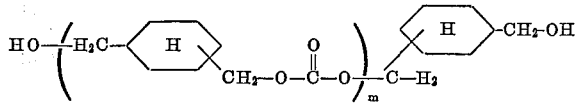

wherein $m$ has a value from 1 to 10, with a terephthalic acid dialkyl ester in the presence of 0.01 to 1 molecular percentage—relative to the terephthalic acid dialkyl ester—of a catalyst selected from the group consisting of alcoholates, hydrides, acetates and oxides of alkali metals, alkaline earth metals and titanium; acetates and oxides of zinc; acetates and oxides of antimony and alkali and ammonium salts of fatty acids with 6 to 12 carbon atoms, at a temperature within the range of from 100 to 270° C., in an oxygen-free atmosphere, and
   (b) subsequently condensation polymerizing at a temperature within the range of from 190 to 280° C. and at a pressure of less than 5 torrs.

2. Method according to claim 1, in which the trans-esterification is carried out in the presence of a diol having the general formula HO—R—OH, wherein R represents the 1,3- or 1,4-dimethylene cyclohexane radical.

3. Method according to claim 1, in which the dihydroxy compound containing carbonate groups is transesterified with dialkyl terephthalate at a molecular ratio of 1:1, and is subsequently subjected to condensation polymerization.

4. Method according to claim 1, in which the dihydroxy compound containing carbonate groups is transesterified with dialkyl terephthalate at a molecular ratio of 2:1, and is subsequently subjected to condensation polymerization.

5. Method according to claim 1, in which the dihydroxy compound containing carbonate groups is transesterified with dialkyl terephthalate at a molecular ratio of 1:2, and in which subsequently the product so obtained is further trans-esterified with twice the molecular quantity—relative to the dihydroxy compound containing carbonate groups—of a diol having the general formula HO—R—OH, wherein R represents the 1,3- or 1,4-dimethylene cyclohexane radical, and is then finally subjected to condensation polymerization.

6. A segment polyester having short, alternating carbonate and terephthalate segments made by the method defined in claim 1.

7. A segment polyester having short, alternating carbonate and terephthalate segments made by the method of claim 3.

8. A segment polyester having short, alternating carbonate and terephthalate segments made by the method of claim 4.

9. A segment polyester having short, alternating carbonate and terephthalate segments made by the method of claim 5.

References Cited

UNITED STATES PATENTS

| | | | |
|---|---|---|---|
| 2,901,466 | 8/1959 | Kibler et al. | 260—75 |
| 3,000,849 | 9/1961 | Clachan et al. | 260—860 |
| 3,117,950 | 1/1964 | Kibler et al. | 260—860 |
| 3,207,814 | 9/1965 | Goldberg | 260—860 |
| 3,313,862 | 4/1967 | Siggel et al. | 260—860 |

SAMUEL H. BLECH, Primary Examiner

JOHN T. GOOLKOSIAN, Assistant Examiner

U.S. Cl. X.R.

260—75, 77.5